3,095,872
BLOOD PRESSURE MEASUREMENT
Walter E. Tolles, Oyster Bay, N.Y., assignor to Cutler-Hammer, Inc., Milwaukee, Wis., a corporation of Delaware
Filed Nov. 27, 1959, Ser. No. 855,699
9 Claims. (Cl. 128—2.05)

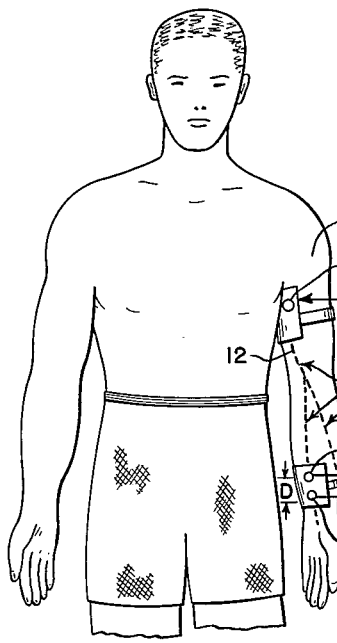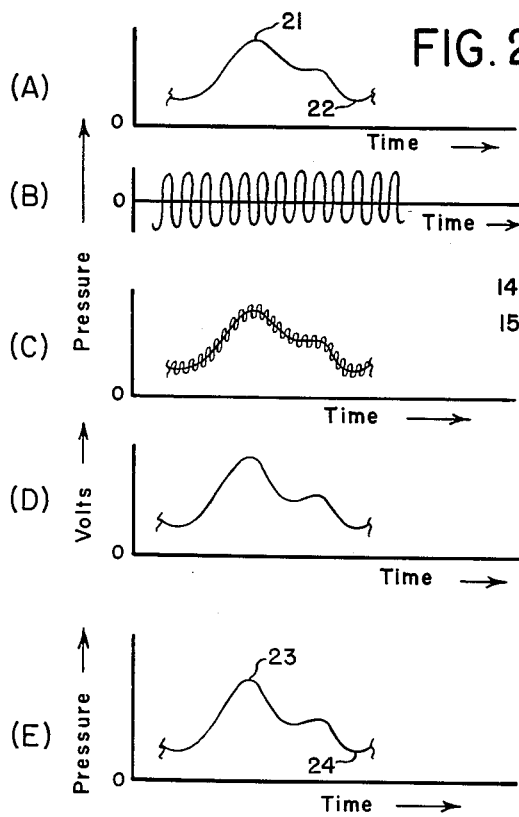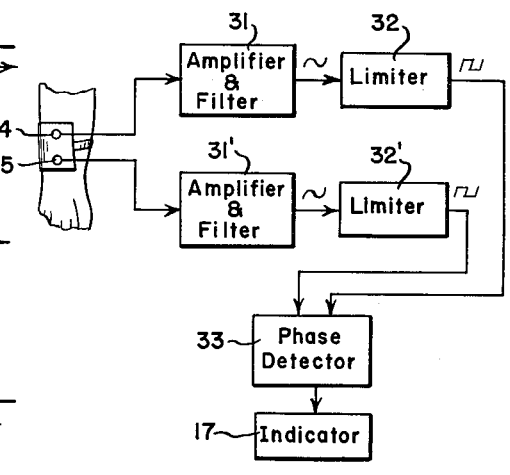

This invention relates to a method of and apparatus for measuring arterial blood pressure. The invention enables blood pressure to be measured continuously, and the apparatus is capable of automatic operation.

In many fields of medicine there is a need for apparatus capable of continuously measuring arterial blood pressure in a simple and convenient manner. The need is particularly keen in hospital operating rooms and the like, and in many experimental fields of medicine, for example in space medicine. In the latter field particularly, there is great need for continuous blood pressure measuring apparatus which will allow moderate activity by the subject and will not produce any general discomfort.

In conventional sphygmomanometry, the subject must remain relatively quiet for many seconds and withstand periodic circulatory occlusion. Furthermore, the measurement gives only two pressure values (i.e. systolic and diastolic) over a considerable number of pulse cycles, which results in the discarding of a substantial amount of information.

Automatic methods of measuring blood pressure are known, based on the sphygmomanometer and digital plethysmograph principles. In addition to the limited information given, these methods are unsatisfactory for monitoring active subjects and the periodic occlusion of the blood circulation causes discomfort. The weight and bulk of the required auxiliary air supply, and equipment to calibrate for environmental pressure, are also disadvantages.

Continuous measurement of blood pressure is possible by arterial cannulation, but serious drawbacks are present. In addition to the trauma of initial arterial puncture, movement of an active subject may cause secondary traumata and there is danger that the cannula may be dislodged from the artery.

Accordingly, it is an object of the present invention to provide a method and apparatus for continuously measuring arterial blood pressure without interfering with the blood circulation or unduly impairing the physical activity and general comfort of the subject.

It is a further object of this invention to provide apparatus which continuously and automatically records arterial blood pressure without the need for constant supervision by an attending physician.

The invention is based on the fact that the velocity of propagation of pressure waves in the blood stream varies with changes in arterial blood pressure. Although the relationship is not linear, it is a single-valued function and hence changes in velocity of propagation can be used to indicate changes in blood pressure.

As is well known, the beating of the heart causes heart pulse pressure waves to travel down the arteries. Since the arterial walls are elastic, expansion and contraction of the walls take place as the pressure changes during a heart beat cycle. This results in transverse waves which propagate down the arterial blood stream with a velocity of propagation which varies with the blood pressure and the elastic condition of the arterial walls. Commonly, velocities of propagation of tens of feet per second are encountered in humans, as contrasted with velocities of propagation of longitudinal compression waves of thousands of feet per second common in liquids. Inasmuch as the elastic condition of the arterial walls of an individual may be expected not to change markedly in a short time, measurement of the velocity of propagation of the heart pulse wave has been proposed as a measurement of blood pressure.

Direct measurement of the time of travel of heart pulse waves between two spaced points along an artery has been proposed, but is subject to considerable inaccuracies. The heart pulse wave is quite complex, and it is difficult to select precisely the same point on the wave as it passes two spaced points so as to get an accurate measurement. Also, the outputs of transducers used to pick up the heart pulse wave may be expected to vary in amplitude due to changes in the intimacy of contact with the artery over which they are placed, slight displacements thereof, etc., unless the subject is immobilized. This further impairs accuracy of measurement.

Proposals have also been made to apply single impact pulses, or a train of impact pulses, to the artery and measure the time of travel thereof between spaced points along the artery. However, considerable distortion of the pulses occurs as they pass along the artery, so that measuring difficulties arise similar to those present in measuring the heart pulse waves. Also, changes in the intimacy of contact and location of both the transmitting and receiving transducers cause amplitude variations, thereby impairing measurement accuracy.

In accordance with the present invention, alternating, substantially symmetrical continuous-wave pressure variations are impressed on the arterial blood stream at a frequency substantially higher than the frequency of heart contraction, and variations in the time of travel or phase of the continuous-wave pressure variations between points spaced along the arterial blood stream are measured. Due to the changing propagation characteristics of the artery as a function of the blood pressure therein, the continuous-wave pressure variations become phase-modulated (or frequency-modulated, since frequency is the time derivative of phase) as a function of the blood pressure. In effect, the applied continuous-wave pressure variation is a carrier which is phase-modulated by the blood pressure variations. Accordingly a signal picked up by a suitable transducer mounted over the artery may then be amplitude-limited so as to eliminate errors due to varying amplitude, while at the same time preserving the necessary information as to blood pressure variations. The phase-modulation may then be detected to obtain a signal varying with the blood pressure over a heart beat cycle.

Advantageously, changes in phase of the applied pressure wave between two spaced points along the arterial blood stream are measured. With a fixed-frequency applied pressure variation, changes in phase between two fixed points are inversely proportional to changes in velocity of propagation, and hence give an indication of changes in blood pressure.

In a preferred embodiment, a transmitting transducer is mounted over an artery and energized with a sinusoidal wave having a frequency substantially higher than the frequency of heart contraction. The transducer produces corresponding sinusoidal pressure variations in the arterial blood stream. These pressure variations are advantageously small compared to the normal arterial blood pressures. A pair of receiving transducers are mounted at spaced points along the arterial blood stream, preferably at a sufficient distance from the transmitting transducer so that pickup of pressure waves transmitted through the flesh rather than the artery is negligible. Accordingly, the signal outputs of the pair of receiving transducers will correspond to the pressure variations in the arterial blood stream at the respective spaced points. A phase detector is then connected to receive the outputs and respond to changes in the phase angle therebetween.

By employing continuous-wave excitation and measuring changes in phase angle of the pressure variations at spaced points, important advantages may be obtained. Some well-known phase detectors are inherently insensitive to amplitude variations, and where necessary limiters may be employed in the output circuits of the receiving transducers, so that the phase measurement is substantially independent of amplitude variations. Thus, variations in input signal amplitude, different amounts of attenuation between the transducers and the artery, different amounts of attenuation along the arterial blood stream, etc. will not markedly affect the accuracy of the measurement. Furthermore, since only a single-frequency sinusoidal wave is required for measuring purposes, filtering may be employed to eliminate the effect of ambient environmental pressures which might give rise to extraneous outputs from the receiving transducers. Also adverse effects due to frequency distortion in the artery are eliminated.

The invention will be more fully understood by reference to the following description of specific embodiments thereof, taken in conjunction with the drawings, in which:

FIG. 1 is a block diagram of a system embodying the principles of the present invention;

FIGS. 2A through 2E are waveforms explanatory of the system of FIG. 1; and

FIG. 3 shows a modification of the receiver portion of FIG. 1.

Referring to FIG. 1, a transmitting transducer 10 is strapped or otherwise affixed to an arm 11 of a subject over the brachial artery 12. The transducer may be of any suitable type, for example a crystal or magnetic transducer. The brachial artery is particularly suitable since it is sufficiently close to the surface to permit pressure waves to be impressed thereon and responses to be obtained therefrom. However, other arteries such as those in the leg or neck may be used if desired.

Transducer 10 is energized from oscillator 13, the output of which is advantageously sinusoidal in waveform and substantially constant in frequency. The mechanical vibrations of the transducer apply an alternating force to the artery wall which in turn produces alternating pressure variations in the arterial blood stream. These constant-frequency pressure variations are superposed on the normal blood pressure variations and are advantageously maintained at a low amplitude level compared to the blood pressures expected to be encountered, for example an amplitude variation corresponding to a few millimeters of mercury.

A pair of pressure-sensitive receiving transducers 14 and 15 are strapped or otherwise affixed to the arm over the brachial artery downstream from transducer 10, in order to respond to the incremental pressure waves produced by the transmitting transducer and yield corresponding outputs. The receiving transducers may be small pressure-sensitive microphones of the crystal, magnetic or capacity types, or the like. They are advantageously mounted in a unit with fixed separation therebetween.

The transmitting transducer, in impressing pressure variations on the artery, may also produce pressure waves in and near the skin. Consequently it is advantageous to place the receiving transducers sufficiently far away from the input transducer to avoid responses to such pressure waves.

The pressure waves impressed on the arterial blood stream by transducer 10 will travel along the artery at a velocity of propagation which varies with the blood pressure, and accordingly will become phase-modulated thereby. It is possible to measure changes in the velocity of propagation in several ways. As is well known, the velocity of propagation $c$ is related to the frequency F of the impressed wave and the wavelength $\lambda$ by the following equation:

$$c = \lambda F \quad (1)$$

Thus, for a constant frequency F, a measurement of wavelength will give the velocity of propagation.

The velocity of propagation can also be expressed as:

$$c = D/t \quad (2)$$

wher D is the distance between the two points of meausrement and $t$ is the time required for the wave to travel from one point to the other. It is also possible to express the velocity of propagation as:

$$c = DF/\varphi \quad (3)$$

where $\varphi$ is the phase angle between the sinusoidal waves at the two points.

It is preferred to obtain an indication of the blood pressure by measuring the phase angle between the outputs of the two receiving transducers 14, 15. To this end an amplifier and phase detector 16 is supplied with the outputs of the receiving transducers and yields an output which varies with the phase angle therebetween. The output of the phase detector is supplied to a suitable indicator 17, which may be a meter, recorder, etc, as desired.

The operation of the apparatus of FIG. 1 is illustrated by the waveforms shown in FIG. 2. Here, FIG. 2A shows a continuous plot of the arterial blood pressure as a function of time covering approximately one heart pulse cycle. The maximum (systolic) pressure developed during the heart contraction is shown at 21, and the minimum (diastolic) pressure present during heart expansion is shown at 22. This waveform will repeat at the frequency of heart contraction, normally of the order of 72 cycles per minute.

FIG. 2B illustrates the constant-frequency sinusoidal pressure variation produced in the arterial blood stream by the transmitting transducer 10. The frequency is substantially higher than the frequency of heart contraction, for example, of the order of 50 to 300 cycles per second. This sinusoidal pressure variation is superposed on the normal arterial pressure variation, giving a resultant pressure variation illustrated in FIG. 2C. FIGS. 2A and 2B are drawn to different scales for clarity. As indicated in FIG. 2C, the impressed sinusoidal pressure variation has an amplitude which is small compared to the normal arterial blood pressure. Thus, the instantaneous blood pressure measured at any time is substantially unchanged by the presence of the superimposed continuous-wave pressure variation.

FIG. 2D illustrates the output of the phase detector 16. As the blood pressure rises to the maximum or systolic pressure, the velocity of propagation increases and accordingly the phase angle between the outputs of receiver transducers 14 and 15 decreases. A number of types of phase detectors are known in the art and may be employed as meets the requirements of a given application. It is here assumed that the phase detector yields a maximum output at zero phase angle, and lower outputs as the phase angle increases. Consequently, the output varies in a manner similar to the blood pressure variation.

It should be understood that the output of the phase detector will not necessarily be linearly proportional to the blood pressure. However, variations in blood pressure will be readily apparent, and the magnitude may be determined by suitable calibration of the indicator. It is advantageous to supply the output of the phase detector to a continuous recorder so that a complete record of the subject's blood pressure may be obtained. The recorder output may be calibrated in units of pressure as indicated in FIG. 2E, where the systolic pressure 23 and diastolic pressure 24 are shown for one heart cycle.

Calibration may be accomplished in any convenient manner. For example, the subject's blood pressure may be determined by conventional techniques at the same time it is obtained by the apparatus of the invention, and the indicator calibrated accordingly.

It will be noted that by making the impressed frequency high compared to the heart beat frequency, the manner in which the blood pressure varies during a single heart beat cycle may be determined. The frequency components in the blood pressure variation will also be considerably lower than the impressed frequency, and may readily be eliminated in the amplifier so as not to interfere with the measurement.

It may often be desired to measure a subject's blood pressure in an environment where ambient pressure variations are present. There may also be amplitude variations in the outputs of the receiver transducers due to many factors. For example, even though the output of oscillator 13 is maintained constant, the pressure variation impressed on the arterial blood stream by transducer 10 may vary due to variations in the attenuation from the skin to the artery. There may also be a varying attenuation along the arterial blood stream, and between the artery and transducers 14 and 15. It is accordingly highly desirable that the indicated blood pressure be made independent of environmental conditions and insensitive to amplitude variations. In such cases the embodiment shown in FIG. 3 may be employed.

Inasmuch as a substantially fixed applied sinusoidal freqeuency is employed for measuring purposes, it is possible to amplify and sharply filter the outputs of the receiving transducers so as to prevent response to other than the desired frequency, thereby eliminating the effects of environmental pressure changes at other frequencies. Accordingly, the outputs of transducers 14 and 15 are supplied to respective amplifiers and filters 31, 31'. The filters are tuned to the frequency of oscillator 13 (FIG. 1) so that frequencies substantially different therefrom will be discriminated against.

The outputs of amplifier-filters 31, 31' are then supplied to respective limiters 32, 32' so as to substantially eliminate amplitude variations. With sufficient amplification and limiting, the outputs of limiters 32, 32' may be substantially square waves, whose relative phase is the same as that of the input sinusoidal waves. These square waves are then supplied to a phase detector 33 and thence to indicator 17. Suitable circuits for measuring the phase between square waves are well known in the art. In the event that a phase detector is employed which is inherently insensitive to amplitude variations, limiters 32, 32' may be omitted.

As illustrated in the drawings, it is preferred to employ a pair of receiving transducers spaced from the transmitting transducer, and utilize variations in the phase angle between the receiver transducer outputs in order to obtain an indication of blood pressure. However, it is possible within the broad scope of the invention to employ only a single receiving transducer and measure variations in the time of travel of the continuous-wave pressure variations between transmitting and receiver transducers. Here also, it is preferred to measure changes in phase between the impressed pressure variation and the received pressure variation.

The invention has been described in connection with preferred embodiments thereof. It will be understood, however, that variations and modifications of the arrangements described may be made within the spirit and scope of the invention.

I claim:

1. Apparatus for continuously measuring arterial blood pressure which comprises transmitting transducer means and driving source for externally impressing an alternating substantially symmetrical continuous-wave pressure variation on the arterial blood stream at a frequency substantially higher than the frequency of heart contraction and with an amplitude which is substantially smaller than the normal arterial blood pressures, whereby the impressed continuous-wave pressure variation is phase-modulated in accordance with the arterial blood pressure over the heart beat cycle as the continuous-wave pressure variation travels along the artery, receiver transducer means externally positioned over the arterial blood stream and spaced from the transmitting transducer means and responsive to said phase-modulated continuous-wave pressure variation to yield an output corresponding thereto, and detecting means insensitive to amplitude variations for detecting the phase-modulation of the output of the receiver transducer means.

2. Apparatus in accordance with claim 1 including filter means between the receiving transducer means and the detecting means for passing outputs having the frequency of the continuous-wave pressure variation and discriminating against frequencies substantially different therefrom.

3. Apparatus for continuously measuring arterial blood pressure which comprises transmitting transducer means and driving source for externally impressing an alternating substantially symmetrical continuous-wave pressure variation on the arterial blood stream at a frequency substantially higher than the frequency of heart contraction and with an amplitude which is substantially smaller than the normal arterial blood pressures, whereby the impressed continuous-wave pressure variation is phase-modulated in accordance with the arterial blood pressure over the heart beat cycle as the continuous-wave pressure variation travels along the artery, a pair of receiving transducers externally positioned over the arterial blood stream at spaced points therealong and responsive to said continuous-wave pressure variation to yield respective outputs, and detecting means insensitive to amplitude variations for detecting changes in the relative phase of the outputs of the receiving transducers.

4. Apparatus in accordance with claim 3 including means for mounting said pair of receiving transducers with substantially fixed separation therebetween.

5. Apparatus in accordance with claim 3 including filter means between the receiving transducers and the detecting means for passing outputs having the frequency of the continuous-wave pressure variation and discriminating against frequencies substantially different therefrom.

6. Apparatus for continuously measuring arterial blood pressure which comprises transmitting transducer means and driving source for externally impressing an alternating substantially symmetrical continuous-wave pressure variation on the arterial blood stream at a frequency substantially higher than the frequency of heart contraction and with an amplitude which is substantially smaller than the normal arterial blood pressure, whereby the impressed continuous-wave pressure variataion is phase-modulated in accordance with the arterial blood pressure over the heart beat cycle as the continuous-wave pressure variation travels along the artery, a pair of receiving transducers externally positioned over the arterial blood stream at spaced points therealong and responsive to said continuous-wave pressure variation to yield respective outputs, means for limiting the outputs of the receiving transducers to respective predetermined amplitude levels, and means for detecting changes in the relative phase of said amplitude-limited outputs.

7. Apparatus in accordance with claim 6 including filter means between the receiving transducers and the means for limiting the outputs thereof for passing outputs having the frequency of the continuous-wave pressure variation and discriminating against frequencies substantially different therefrom.

8. The method of measuring arterial blood pressure which comprises externally impressing an alternating substantially symmetrical continuous-wave pressure variation on the arterial blood stream having a frequency substantially higher than the frequency of heart contraction and an amplitude which is substantially smaller than the normal arterial blood pressures, whereby the impressed continuous-wave pressure variataion is phase-modulated in accordance with the arterial blood pressure over the heart beat cycle as the continuous-wave pressure variation travels along the artery, externally deriving a signal corresponding to said phase-modulated continuous-wave pressure variation at a point over the arterial blood stream spaced from the point of impressing thereof, and detecting the phase-modulation of said signal substantially independent of the amplitude thereof.

9. A method in accordance with claim 8 including externally deriving signals corresponding to the continuous-wave pressure variataion at a pair of spaced points along the arterial blood stream, limiting the amplitudes of the signals, and measuring the relative phase of the amplitude-limited signals.

References Cited in the file of this patent
UNITED STATES PATENTS

| | | |
|---|---|---|
| 2,480,646 | Grabau | Aug. 30, 1949 |
| 2,515,221 | Henning | July 18, 1950 |
| 2,658,505 | Sheer | Nov. 10, 1953 |
| 2,836,173 | Uemura et al. | May 27, 1958 |
| 2,894,595 | Brown | July 14, 1959 |
| 2,944,542 | Barnett et al. | July 12, 1960 |